United States Patent [19]
Shimada

[11] Patent Number: 5,640,455
[45] Date of Patent: Jun. 17, 1997

[54] SECRET-KEY ENCIPHERING METHOD AND ARRANGEMENT THEREFOR CAPABLE OF PREVENTING UNFAIR ACQUIREMENT OF INFORMATION

[75] Inventor: Michio Shimada, Tokyo, Japan

[73] Assignee: NEC Corporation, Tokyo, Japan

[21] Appl. No.: 534,816

[22] Filed: Sep. 27, 1995

[30] Foreign Application Priority Data

Sep. 27, 1994 [JP] Japan .................. 6-230952

[51] Int. Cl.$^6$ .................................................. H04K 1/00
[52] U.S. Cl. .......................... 380/42; 380/28; 380/49
[58] Field of Search .................. 380/42, 49, 50, 380/28

[56] References Cited

U.S. PATENT DOCUMENTS 5,301,235  4/1994  Shimada .................. 380/42

FOREIGN PATENT DOCUMENTS 6-75525  3/1994  Japan .

OTHER PUBLICATIONS

"Cryptography and Data Security"; Purdue University (Jul. 5, 1995); Denning, published by Addison–Wesley Publishing Company, Inc.

"Introduction to Decipherment by the use of a Computer"; Matsui, published by Morikita Pub. Corp. (1990).

*Primary Examiner*—David C. Cain
*Attorney, Agent, or Firm*—Sughrue, Mion, Zinn, Macpeak & Seas

[57] ABSTRACT

ELT transformation circuits $101_1$ to $101_m$ are preliminarily supplied with ELT transformation parameters $a_i$, $b_i$, and $p_i$ ($i=1, 2, \ldots, m$). When a plaintext of n bits long is supplied to the ELT transformation circuit $101_1$ via an input terminal 104, the ELT transformation circuit $101_1$ carries out ELT transformation on the plaintext by the use of ELT transformation parameters $a_1$, $b_1$, and $p_1$ supplied from an input terminal $105_1$. An enciphering circuit $102_1$ enciphers an n/2-bit input with reference to a cryptographic key $K_1$ from an input terminal $106_1$. Supplied with two n-bit inputs, an exclusive-OR circuit $103_1$ carries out an exclusive-OR operation between every corresponding bits of the same order. Subsequently, similar operation as mentioned above is repeated. The ELT transformation circuit $101_m$ at a final stage delivers a ciphertext to an output terminal 107.

7 Claims, 4 Drawing Sheets

SECRET-KEY ENCIPHERING METHOD AND ARRANGEMENT THEREFOR CAPABLE OF PREVENTING UNFAIR ACQUIREMENT OF INFORMATION

BACKGROUND OF THE INVENTION

This invention relates to a secret-key enciphering method and an arrangement therefor and, in particular, to a secret-key enciphering method and a secret-key enciphering arrangement which are for use in a communication system or a computer system and which are for transforming original information into a cipher through a predetermined operation and for reversing the cipher into the original information in order to prevent an unauthorized person from unfair acquirement of the information.

In a communication system or a computer system, it is a general practice to transform original information into a cipher through a predetermined operation and to reverse the cipher into the original information in order to prevent an unauthorized person from unfair acquirement of the information. In this specification, a process of transforming the original information into the cipher is called enciphered while a process of reversing the cipher into the original information is called a decipherment. The original information before encipherment is called a plaintext. The cipher obtained by subjecting the information to the encipherment process is called a ciphertext.

As a method of enciphering the information, a linear transformation cipher has widely been used. This cipher transforms an integer expression M of the plaintext into an integer expression C of the ciphertext through a process represented by the following equation.

$$C = aM + b \pmod{p} \quad (1)$$

Herein, a, b, and p are predetermined integers and X (mod Y) implies a remainder when X is divided by Y, In the following description, Y in X (mod Y) is called a modulo. The remainder when X is divided by Y is called a residue.

The ciphertext can be reversed into the plaintext through a process represented by the following equation.

$$M = (C - b)/a \pmod{p} \quad (2)$$

Herein, a division $z = x/y \pmod{p}$ implies a calculation of z satisfying $x = yz \pmod{p}$. A method of calculating the division is described, for example, in a book entitled "Cryptography and Data Security" written by Dorothy Elizabeth Robling Denning, published by Addison-Wesley Publishing Company, Inc., 1982, pp. 43–45.

In the linear transformation cipher, either or a both of a and b are used as a cryptographic key which comprises secret values preliminarily determined by communicators, while a value obtained by adding "1" to the maximum value in the plaintext is selected as p. The linear transformation cipher has been used for a long time because it is easily processed. For example, the linear transformation cipher with a equal to 1 and b used as a cryptographic key has been utilized since the era of Caesar. Explanation of the linear transformation cipher is given, for example, in a book entitled "Introduction to Decipherment by the use of a Computer" written by Kineo Matsui and published by Morikita Publishing Corp., 1990 and in the above-mentioned book entitled "Cryptography and Data Security" written by Denning, pp. 66–67. In the latter reference, the cipher is not called the linear cipher but is referred to as an affine transformation cipher.

In a cipher communication apparatus based on the linear transformation cipher, however, a linear relationship is kept between the plaintext and the ciphertext. If several plaintext-ciphertext pairs are obtained, the cryptographic key can be undesiredly calculated by solving a linear equation.

In view of the above, it has been a practice to repeat linear transformation by the use of different moduli relatively prime to each other. Specifically, it is a general practice to repeat linear transformation m times by the use of different moduli $p_i$ (i=1, 2, . . . , m) relatively prime to each other to transform a plaintext M into a ciphertext C, as represented by the following equations.

$$\left. \begin{array}{l} x_1 = a_1 M + b_1 \pmod{p_1} \\ \cdot \\ \cdot \\ \cdot \\ x_i = a_i x_{i-1} + b_i \pmod{p_i}, i = 2, 3, \ldots, m-1 \\ \cdot \\ \cdot \\ \cdot \\ C = a_m x_{m-1} + b_m \pmod{p_m} \end{array} \right\} \quad (3)$$

By repeating linear transformation by the use of the different moduli relatively prime to each other, nonlinear transformation is achieved. In the following description, the cipher defined by the foregoing equations is called a primitive multiple-modulus cipher.

In the primitive multiple-modulus cipher, it is necessary to select a cryptographic key satisfying $p_1 < p_2 < \ldots < p_m$ in order to correctly reverse the plaintext from the ciphertext. Otherwise, for several ciphertexts, a plurality of plaintexts may correspond to one ciphertext. In this connection, the ciphertext inevitably has a bit length longer than that of the plaintext in the primitive multiple-modulus cipher.

However, in data communication and the like, use is generally made of such a cipher that the plaintext of 64 bits are transformed into the ciphertext of 64 bits. Accordingly, the above-mentioned primitive multiple-modulus cipher can not be used in the data communication.

In order to coincide the length of the plaintext and the length of the ciphertext, use has been made of a technique which will presently be described. It is assumed here that a transformation $f[a_i, b_i, p_i]$ is a process of producing an output $a_i x + b_i \pmod{p_i}$ when an input x has a value smaller than $p_i$ and of producing an output equivalent to x when the input x is not smaller than $p_i$ while a transformation g is a process of producing an output obtained by inverting a most significant bit of an input. Instead of the linear transformation, a transformation composed of these transformations in the order of $f[a_i, b_i, p_i]$, g, and $f[a_i, b_i, p_i]$ is repeatedly carried out. Such transformation composed of $f[a_i, b_i, p_i]$, g, and $f[a_i, b_i, p_i]$ in this order is represented by $ELT[a_i, b_i, p_i]$.

Specifically, the above-mentioned transformation is represented by the following equations.

$$x_1 = ELT[a_1, b_1, p_1] (M) \\ \cdot \\ \cdot \\ \cdot \\ x_i = ELT[a_i, b_i, p_i] (x_{i-1}), i = 2, \ldots, m-1 \\ \cdot \\ \cdot \\ \cdot \\ C = ELT[a_m, b_m, p_m] (x_{m-1})$$ (4)

In this manner, any plaintext of n bits can be transformed into a ciphertext of n bits as far as different n-bit integers relatively prime to each other are selected as $p_i$ (i=1, 2, ..., m). Herein, a cipher using the enciphering process represented by the above-mentioned equations is called a multiple-modulus cipher.

In order to reverse the ciphertext c of the above-mentioned multiple-modulus cipher into the plaintext M, a process represented by the following equations is carried out.

$$x_{m-1} = ELT[a_m', b_m', p_m] (C) \\ \cdot \\ \cdot \\ \cdot \\ x_{i-1} = ELT[a_i', b_i', p_i] (x_i), i = m-1, \ldots, 2 \\ \cdot \\ \cdot \\ \cdot \\ M = ELT[a_m', b_m', p_m] (x_1)$$ (5)

Herein, $a_i'$ and $b_i'$ are values defined by $a_i' = 1/a_i \pmod{p_i}$ and $b_i' = -b_i/a_i \pmod{p_i}$, respectively. Accordingly, only by changing variables, both encipherment and decipherment of the multiple-modulus cipher can be carried out by the use of a same arrangement.

Encipherment of the multiple-modulus cipher is generally carried out in the manner described above. In order to improve a scrambling effect, the transformation g may comprise, instead of the process of inverting the most significant bit of the input, a process of inverting the most significant bit and carrying out an exclusive-OR operation between a plurality of high-order bits following the most significant bit and a plurality of bits determined in dependence upon low-order bits than those bits.

In order to improve the scrambling effect, the transformation g may be carried out between a transformation ELT (Expanded Linear Transformation) and another transformation ELT. In this event, encipherment is carried out in accordance with the following equations.

$$x_1 = g(ELT[a_1, b_1, p_1] (M)) \\ \cdot \\ \cdot \\ \cdot \\ x_i = g(ELT[a_i, b_i, p_i] (x_{i-1})), i = 2, \ldots, m-1 \\ \cdot \\ \cdot \\ \cdot \\ C = g(ELT[a_m, b_m, p_m] (x_{m-1}))$$ (6)

Otherwise, encipherment is carried out in accordance with the following equations.

$$x_1 = ELT[a_1, b_1, p_1] (g(M)) \\ \cdot \\ \cdot \\ \cdot \\ x_i = ELT[a_i, b_i, p_i] (g(x_{i-1})), i = 2, \ldots, m-1 \\ \cdot \\ \cdot \\ \cdot \\ C = ELT[a_m, b_m, p_m] (g(x_{m-1}))$$ (7)

The principles of the primitive multiple-modulus cipher and the multiple-modulus cipher described in conjunction with Equations (3) through (7) and the arrangements for executing encipherment and decipherment of these ciphers are described in detail in Japanese Patent Publication (JP-A) No. 75525/1994 (Japanese Patent Application No. 128409/1992) and in U.S. Pat. No. 5,301,235.

However, the multiple-modulus cipher used in the conventional secret-key enciphering method and the arrangement therefor has a disadvantage that the scrambling effect is not sufficient. For example, it is assumed that $p_1$ and $p_2$ have values approximate to a half of $2^n$ namely, $2^{n-1}$ when m=2. In this event, when the relationship $M < 2^{n-1}$ is kept in the plaintext M, the relationship $C < 2^{n-1}$ is kept also in the ciphertext C at a high probability.

On the contrary, when the relationship $M > 2^{n-1}$ is kept in the plaintext M, the relationship $C > 2^{n-1}$ is kept also in the ciphertext C at a high probability, Accordingly, the value of the most significant bit of the plaintext M can be deduced from the value of the most significant bit of the ciphertext C. This problem can not be eliminated even with any transformation used as the transformation g and even when the transformation g is carried out between the transformation ELT and the transformation ELT.

SUMMARY OF THE INVENTION

It is therefore an object of this invention to provide a secret-key enciphering method and an arrangement therefor which prevent a decrease of a scrambling effect even if a cryptographic key of a multiple-modulus cipher has a specific value.

Other objects of this invention will become clear as the description proceeds.

On describing the gist of this invention, it is possible to understand that a secret-key enciphering method in which a first transformation is a process of producing, when an input x has a value smaller than $p_i$ an output represented by $a_i x + b_i \pmod{p_i}$ where $a_i$, $b_i$, and $p_i$ (i=1, 2, ..., m) are predetermined integers and of producing an output equivalent to x when the input x has a value not smaller than $p_i$ a second transformation being a process of producing an output obtained by inverting a most significant bit of an input.

According to an aspect of this invention, the secret-key enciphering method comprises the steps of; subjecting an n-bit input to ELT transformation composed of the first, the second, and the first transformations in this order to produce an n-bit transformation result; enciphering, in accordance with a predetermined cryptosystem, low-order n/2 bits of the n-bit transformation result of the ELT transformation to obtain an n/2-bit ciphertext; carrying out an exclusive-OR operation between the n/2-bit ciphertext and high-order n/2 bits of the n-bit transformation result of the ELT transformation for every corresponding bits to produce an exclusive-OR operation result; carrying out the above-mentioned ELT transformation upon an n-bit input composed of the exclusive-OR operation result and the low-order n/2 bits of the n-bit transformation result of the ELT transformation as high-order n/2 bits and low-order n/2 bits, respectively; repeating the above-mentioned steps m−1 times (m being a predetermined integer not smaller than 2) in total; and carrying out the above-mentioned ELT transformation of an m-th (i=m) time upon an n-bit input composed of an (m−1)-th exclusive-OR operation result and low-order n/2 bits of an n-bit transformation result of the above-mentioned ELT transformation of an (m−1)-th (i=m−1) time to produce a transformation result as a ciphertext.

The ELT transformation may be carried out by the use of parameters $1/a_{m-i+1}$ (mod $p_{m-i+1}$), $-b_{m-i+1}/a_{m-i+1}$ (mod $p_{m-i+1}$), and $p_{m-i+1}$ instead of the above-mentioned integers. $a_i$, $b_i$, and $p_i$ (i=1, 2, ..., m), respectively.

The predetermined cryptosystem may comprise the steps of: subjecting an n/2-bit input to the above-mentioned ELT transformation of a first time by the use of parameters $A_{i,1}$, $B_{i,1}$, and $P_{i,1}$ among predetermined n/2-bit integers $A_{i,j}$, $B_{i,j}$, and $P_{i,j}$ (i=1, 2, ..., m−1, j=1, 2) to produce a transformation result; carrying out an exclusive-OR operation between low-order n/4 bits and high-order n/4 bits of the transformation result in bit-to-bit correspondence to produce an exclusive-OR operation result; and carrying out the above-mentioned ELT transformation of a second time upon an input composed of the exclusive-OR operation result and the low-order n/4 bits of the transformation result as high-order n/4 bits and low-order n/4 bits, respectively, to produce an n/2-bit transformation result as a ciphertext.

According to another aspect of this invention, the secret-key enciphering arrangement comprises: ELT transformation circuits, m in total, each of which is responsive to an i-th n-bit input and carries out ELT transformation composed of the first, the second, and the first transformations in this order; enciphering circuits, (m−1) in total, each of which is for enciphering, in accordance with a predetermined cryptosystem, low-order n/2 bits of an n-bit transformation result produced by the k-th (k=1, 2, ..., m−1) one of the ELT transformation circuits to produce a k-th n/2-bit ciphertext; and exclusive-OR circuits, (m−1) in total, each of which is for carrying out an exclusive-OR operation between high-order n/2 bits of the n-bit transformation result produced by the k-th ELT transformation circuit and the ciphertext produced by a k-th one of the enciphering circuits for every corresponding bits to produce an operation result which is delivered to a (k+1)-th one of the ELT transformation circuits; the (k+1)-th ELT transformation circuit carrying out ELT transformation upon an n-bit input composed of the operation result produced by a k-th one of the exclusive-OR circuits and the low-order n/2 bits of the n-bit transformation result produced by the k-th ELT transformation circuit as high-order n/2 bits and low-order n/2 bits, respectively, until an m-th one of the ELT transformation circuits produces a ciphertext.

The enciphering circuit may carry out the above-mentioned ELT transformation of a first time upon an n/2-bit input by the use of parameters $A_{i,1}$, $B_{i,1}$, and $p_{i,1}$ among predetermined n/2-bit integers $A_{i,j}$, $B_{i,j}$, and $p_{i,j}$ (i=1, 2, ..., m−1, j=1, 2) as a cryptographic key $K_i$ to produce a transformation result; an exclusive-OR operation between low-order n/4 bits and high-order n/4 bits of the transformation result in bit-to-bit correspondence to produce an exclusive-OR operation result; and the above-mentioned ELT transformation of a second time upon an input composed of the exclusive-OR operation result and the low-order n/4 bits of the transformation result as high-order n/4 bits and low-order n/4 bits, respectively, to produce an n/2-bit transformation result as a ciphertext.

According to still another aspect of this invention, the secret-key enciphering arrangement comprises: an ELT transformation circuit responsive to an i-th n-bit input for carrying out ELT transformation composed of the first, the second, and the first transformations in this order; an enciphering circuit for enciphering, in accordance with a predetermined crypto-system and by the use of a cryptographic key $K_i$ (i=1, ..., m−1), low-order n/2 bits of an n-bit transformation result produced by the ELT transformation circuit to produce an n/2-bit ciphertext; an exclusive-OR circuit for carrying out an exclusive-OR operation between high-order n/2 bits of the n-bit transformation result produced by the ELT transformation circuit and the ciphertext produced by the enciphering circuit for every corresponding bits to produce an operation result which is delivered to the ELT transformation circuit; a register for holding an n-bit, input composed of the operation result produced by the exclusive-OR circuit and the low-order n/2 bits of the n-bit transformation result produced by the ELT transformation circuit as high-order n/2 bits and low-order n/2 bits, respectively; a selector for selecting one of an n-bit input from an external source and an n-bit output of the register to supply a selected one to the ELT transformation circuits as the input x; and a control circuit for successively supplying the ELT transformation circuit and the enciphering circuit with the integers $a_i$, $b_i$, and $p_i$ and the cryptographic key $K_i$ and for controlling the selector to make the selector select the output of the register when a new value is held in the register; an m-th transformation result of the ELT transformation circuit being delivered to an output terminal.

The enciphering circuit may carry out the above-mentioned ELT transformation of a first time upon an n/2-bit input by the use of parameters $A_{i,1}$, $B_{i,j}$, and $P_{i,j}$ among predetermined n/2-bit integers $A_{i,j}$, $B_{i,j}$, and $P_{i,j}$ (i=1, 2, ..., m−1, j=1, 2) as a cryptographic key $K_i$ to produce a transformation result; an exclusive-OR operation between low-order n/4 bits and high-order n/4 bits of the transformation result in bit-to-bit correspondence to produce an exclusive-OR operation result; and the above-mentioned ELT transformation of a second time upon an input composed of the exclusive-OR operation result and the low-order n/4 bits of the transformation result as high-order n/4 bits and low-order n/4 bits, respectively, to produce an n/2-bit transformation result as a ciphertext.

DESCRIPTION OF THE PREFERRED EMBODIMENTS

Figure 1:
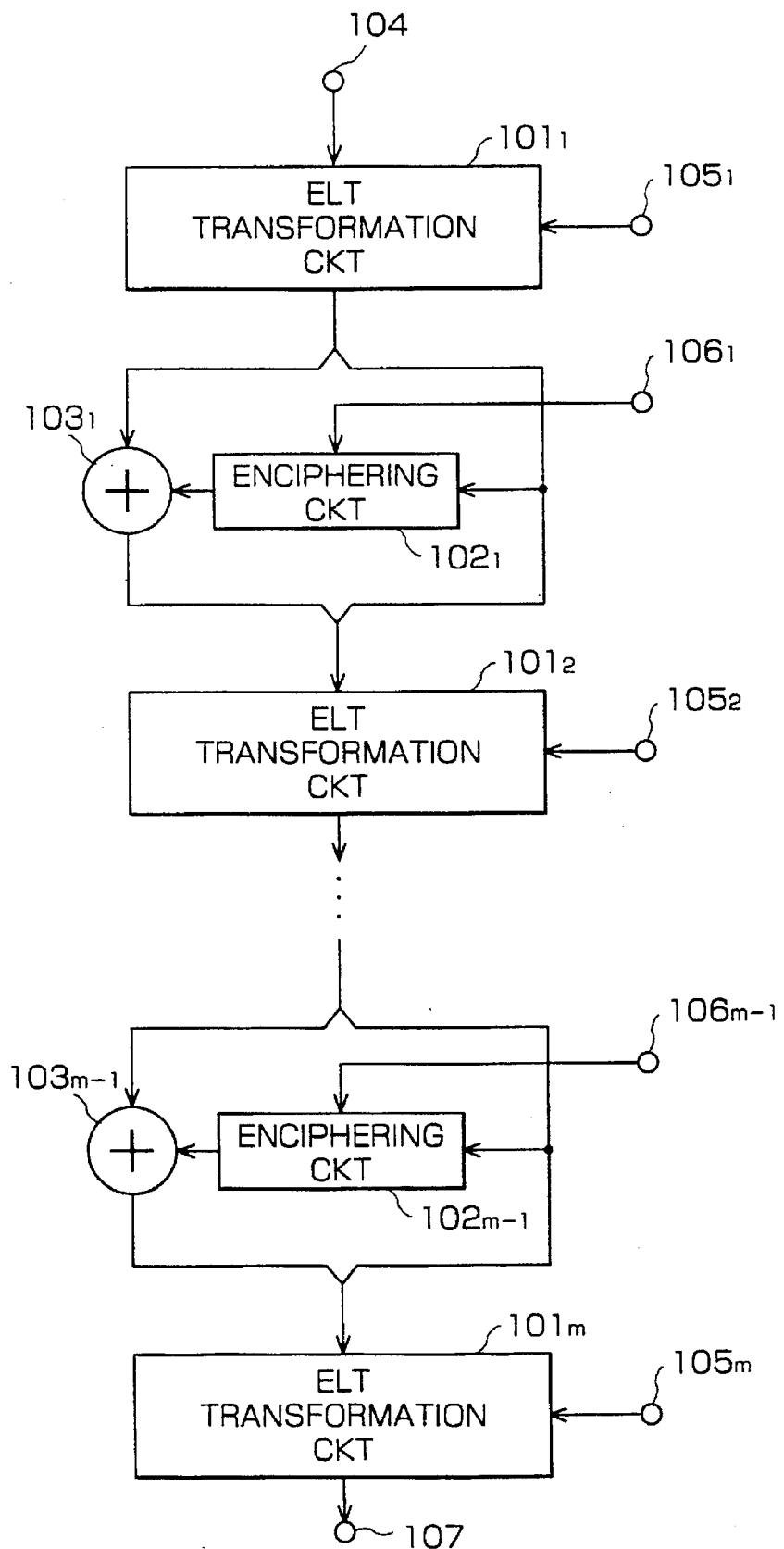
FIG. 1 shows a block diagram of a secret-key enciphering arrangement according to a first embodiment of this invention.

Now, description will be made as regards several embodiments of this invention. FIG. 1 is a block diagram of a first embodiment of this invention. As illustrated in the figure, this embodiment comprises ELT transformation circuits $101_1$ to $101_m$, m in number, enciphering circuits $102_1$ to $102_{m-1}$, (m−1) in number, exclusive-OR circuits $103_1$ to $103_{m-1}$, (m−1) in number, a ciphertext input terminal 104, transformation parameter input terminals $105_1$ to $105_m$, cryptographic key input terminals $106_1$ to $106_{m-1}$, and an output terminal 107.

Figure 2:
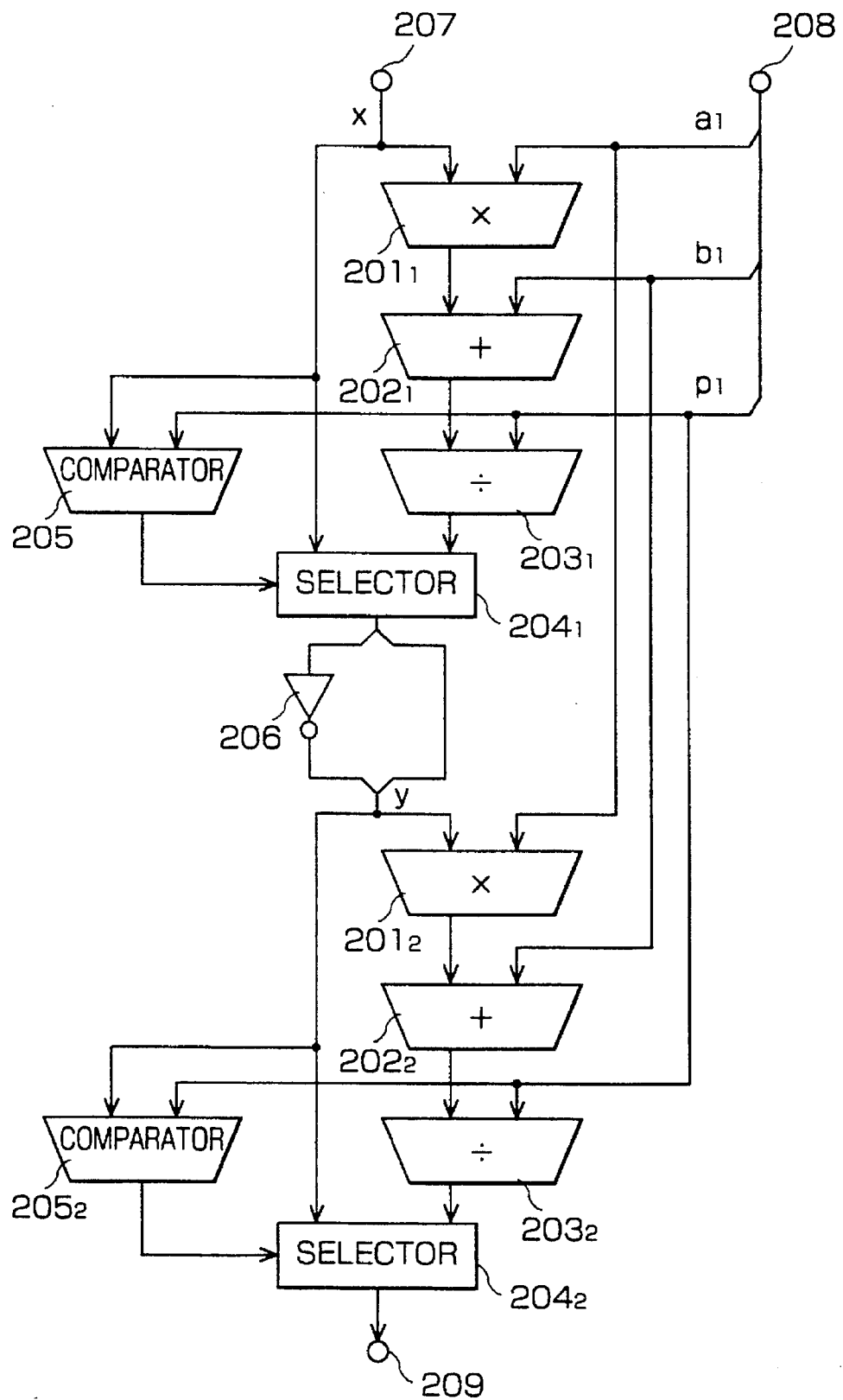
FIG. 2 shows a circuit diagram of one example of an ELT transformation circuit used in this invention.

Each of the ELT transformation circuits $101_1$ to $101_m$ is responsive to an n-bit input (n being a multiple of four and generally equal to "64" in data communication) and carries out a transformation ELT to produce a transformation result. As shown in FIG. 2, each of the ELT transformation circuits comprises multipliers $201_1$ and $201_2$, adders $202_1$ and $202_2$, dividers $203_1$ and $203_2$, selectors $204_1$ and $204_2$, comparators $205_1$ and $205_2$, and a NOT circuit 206. Each of the dividers $203_1$ and $203_2$ is for producing a remainder when one of the two inputs is divided by the other.

Figure 3:
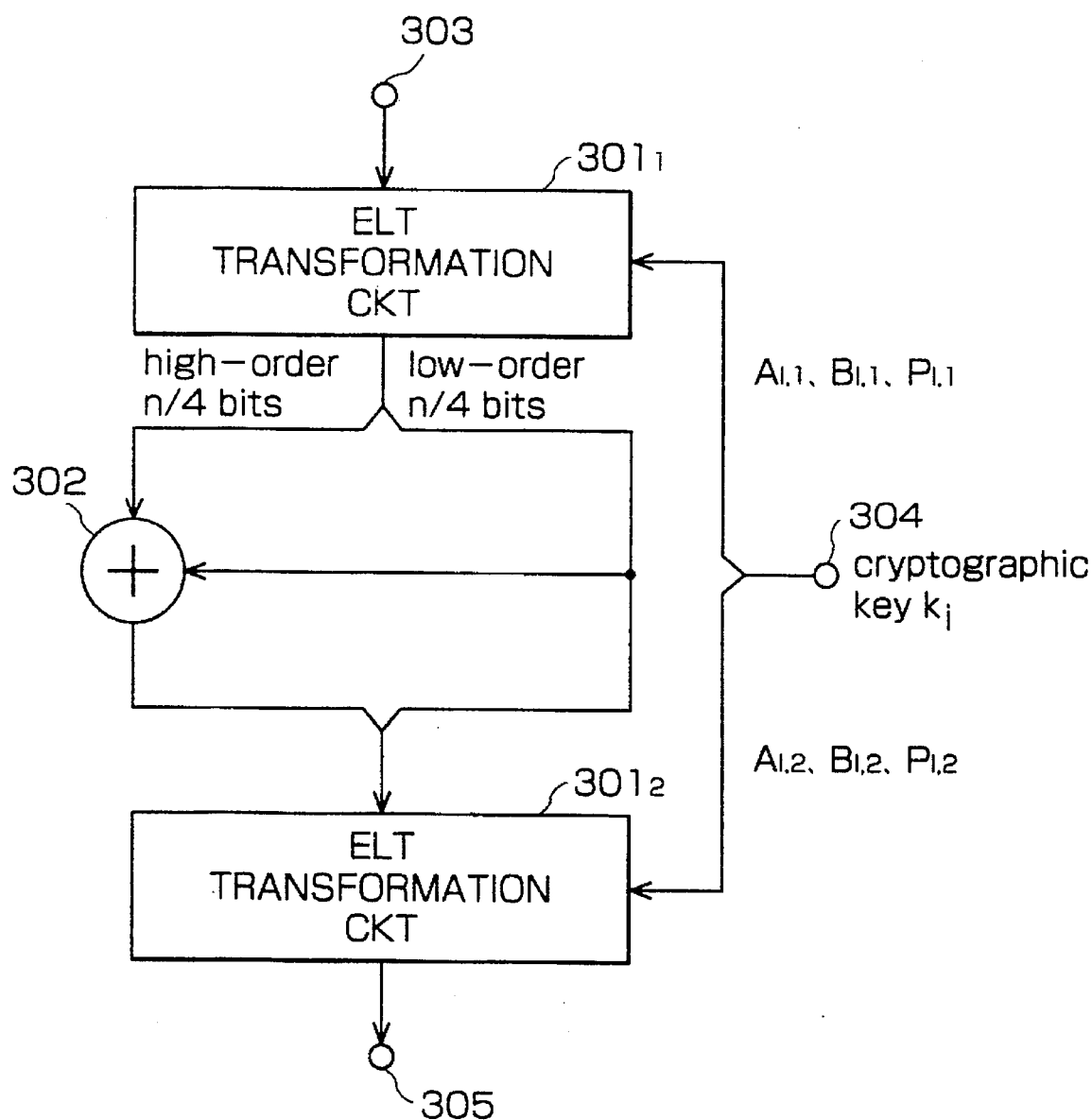
FIG. 3 shows a block diagram of one example of an enciphering circuit used in this invention.

Each of the enciphering circuits $102_1$ to $102_{m-1}$ in FIG. 1 is for enciphering an n/2-bit input to produce a ciphertext. As illustrated in FIG. 3, each of the enciphering circuits comprises ELT transformation circuits $301_1$ and $301_2$, an exclusive-OR circuit 302, an input terminal 303, a cryptographic key input terminal 304, and an output terminal 305.

Each of the ELT transformation circuits $301_1$ and $301_2$ is for carrying out a transformation ELT upon an n/2-bit input to produce a transformation result and has a circuit structure similar to that illustrated in FIG. 2 except that the length of an integer to be processed is equal to a half of that in the ELT transformation circuits $101_1$ to $101_m$ in FIG. 1. The exclusive-OR circuit 302 is for carrying out an exclusive-OR operation between two n/4-bit inputs bit by bit to produce a calculation result.

Next, description will be made about an operation of the ELT transformation circuit illustrated in FIG. 2. Then, description will proceed to an operation of the enciphering circuit illustrated in FIG. 3. Finally, an operation of the first embodiment in FIG. 1 will be described. In the ELT transformation circuit in FIG. 2, it is assumed that an input terminal 208 is supplied with linear transformation parameters $a_i$, $b_i$, and $p_i$. Among those, $a_i$ is supplied to the multipliers $201_1$ and $201_2$. $b_i$ is supplied to the adders $202_1$ and $202_2$. $p_i$ is supplied to the dividers $203_1$ and $203_2$. On the other hand, an integer x to be subjected to the transformation ELT is supplied via an input terminal 207 to the multiplier $201_1$, the selector $204_1$, and the comparator $205_1$.

The multiplier $201_1$ calculates a product between the parameter $a_i$ and the integer x to produce a calculation result $a_i x$ which is supplied to the adder $202_1$. The adder $202_1$ adds the calculation result $a_i x$ and the parameter $b_i$ supplied via the input terminal 208 to produce an addition result ($a_i x + b_i$) which is supplied to the divider $203_1$. The divider $203_1$ divides the addition result ($a_i x + b_i$) by the parameter $p_i$ supplied via the input terminal 208 to produce a residue $a_i x + b_i$ (mod $p_i$) which is supplied to the selector $204_1$.

On the other hand, the comparator $205_1$ compares the input integer x and the parameter $p_i$ to produce a comparison result which is supplied to the selector $204_1$ as a select signal. When the comparison result indicates $x \geq p_i$ the selector $204_1$ selects the integer x supplied via the input terminal 207 to produce it as an output. When the comparison result indicates $x < p_i$ the selector selects the output of the divider $203_1$, namely, $a_i x + b_i$ (mod $p_i$) to produce it as an output. The output of the selector $204_1$ is subjected to inversion of the most significant bit at the NOT circuit 206.

Among the outputs of the selector $204_1$, the output with the most significant bit alone inverted by the above-mentioned NOT circuit 206 is represented by y. In this event, the multiplier $201_2$, the adder $202_2$, the divider $203_2$, the selector $204_2$, and the comparator $205_2$ carry out, upon y, operations similar to those carried out upon the integer x by the multiplier $201_1$, the adder $202_1$, the divider $203_1$, the selector $204_1$, and the comparator $205_1$. The selector $204_2$ produces an output via an output terminal 209 as a transformation result of the transformation ELT.

Next, description will be made as regards an operation of the enciphering circuit illustrated in FIG. 3. The input terminal 304 is preliminarily supplied with a cryptographic key $K_i$. The cryptographic key $K_i$ is a group of parameters used in two ELT transformations. It is assumed that $K_i = (A_{i,1}, B_{i,1}, P_{i,1}, A_{i,2}, B_{i,2}, P_{i,2})$. Among those parameters, $A_{i,1}$, $B_{i,1}$, and $P_{i,1}$, are supplied to the ELT transformation circuit $301_1$ while $A_{i,2}$, $B_{i,2}$, $P_{i,2}$, are supplied to the ELT transformation circuit $301_2$.

The input terminal 303 is supplied with an input of n/2 bits long to be subjected to encipherment. This input is supplied to the ELT transformation circuit $301_1$ to be subjected to ELT transformation by the use of the above-mentioned parameters $A_{i,1}$, $B_{i,1}$, and $P_{i,1}$. In the output of n/2 bits long extracted from the ELT transformation circuit $301_1$, low-order n/4 bits are supplied to one input terminal of the exclusive-OR circuit 302 and to the ELT transformation circuit $301_2$. On the other hand, most significant n/4 bits are supplied to the other input terminal of the exclusive-OR circuit 302.

As mentioned above, the exclusive-OR circuit 302 carries out an exclusive-OR operation between n/4-bit inputs respectively supplied through the two input terminals for every corresponding bits of the same order and produces an n/4-bit calculation result which is supplied to the ELT transformation circuit $301_2$. The ELT transformation circuit $301_2$ receives an input of n/2 bits in total composed of the n/4 bits supplied from the exclusive-OR circuit 302 and the n/4 bits supplied from the ELT transformation circuit $301_1$ as high-order n/4 bits and low-order n/4 bits, respectively. The input is subjected to ELT transformation by the use of the above-mentioned parameters $A_{i,2}$, $B_{i,2}$, and $P_{i,2}$. The ELT transformation result by the ELT transformation circuit $301_2$ is delivered to the output terminal 305 as an output of the enciphering circuit.

Next, description will be made about the operation of the first embodiment in FIG. 1. Through the input terminals $105_1$ to $105_m$ (corresponding to the input $101_1$ to $101_m$ are preliminarily supplied with the ELT terminal 208 in FIG. 2), the ELT transformation circuits transformation parameters $a_i$, $b_i$, and $p_i$ (i=1, 2, . . . , m). The enciphering circuits $102_1$ to $102_{m-1}$ are supplied with the cryptographic key $K_i$ through the input terminals $106_1$ to $106_{m-1}$ (corresponding to the input terminal 304 in FIG. 3).

In the above-mentioned state, it is assumed that the ELT transformation circuit $101_1$ is supplied via the input terminal 104 (corresponding to the input terminal 207 in FIG. 2) with a plaintext of n bits long. The ELT transformation circuit $101_1$ carries out ELT transformation on the plaintext by the use of the ELT transformation parameters $a_1$, $b_1$, and $p_1$ supplied via the input terminal $105_1$ to produce an n-bit transformation result. In the n-bit transformation result, low-order n/2 bits are supplied to the enciphering circuit $102_1$ and the ELT transformation circuit $101_2$ while high-order n/2 bits are supplied to one input terminal of the exclusive-OR circuit $103_1$.

With reference to the cryptographic key $K_1$ supplied via the input terminal $106_1$, the enciphering circuit $102_1$ enciphers the n/2-bit input (corresponding to the input via the input terminal 303 in FIG. 3) to produce an n/2-bit ciphertext which is supplied to the other input terminal of the exclusive-OR circuit $103_1$. Supplied with two n/2-bit inputs, the exclusive-OR circuit $103_1$ carries out an exclusive OR operation between the every corresponding bits of the same order to produce an n/2 bit calculation result which is supplied to the ELT transformation circuit $101_2$.

The ELT transformation circuit $101_2$ receives an n/bit input composed of the n/2 bits supplied from the exclusive-OR circuit $103_1$ and the n/2 bits supplied from the ELT transformation circuit $101_1$ as high-order n/2 bits and low-order n/2 bits, respectively. The input of the n bits in total is subjected to ELT transformation by the use of the ELT transformation parameters $a_2$, $b_2$, and $p_2$ supplied via the input terminal $105_2$ to produce an n-bit transformation result. In the n-bit transformation result, low-order n/2 bits are supplied to the enciphering circuit $102_2$ and the ELT transformation circuit $101_3$ (both of them being not illustrated in the figure) at the next stage while high-order n/2 bits are supplied to the exclusive-OR circuit $103_2$ at the next stage.

Subsequently, the operation similar to that described above is repeatedly carried out until the ELT transformation $101_m$ is reached. The ELT transformation circuit $101_m$ at the final stage produces a ciphertext to be delivered to the output terminal 107 (corresponding to the output terminal 209 in FIG. 2).

As described above, in this embodiment, the low-order n/2 bits of the output of the ELT transformation circuit $101_i$ is enciphered by the enciphering circuit $102_i$. The exclusive-OR circuit $103_1$ carries out the exclusive-OR operation between the output of the enciphering circuit $102_i$ and the high-order n/2 bits which are the output of the ELT transformation circuit $101_i$. Thus, the integers present in a small section of the length $2^{n/2}$ are transferred to another small section of the length $2^{n/2}$ one by one. Accordingly, it is possible to uniformly scramble the output of the ELT transformation circuit $101_1$ within the range between 0 and $2^n-1$. Therefore, even if the transformation parameter $p_i$ has a value close to $2^n-1$, the ciphertext is uniformly distributed over the range between 0 and $2^n-1$.

It is obvious that the embodiment illustrated in FIG. 1 is applicable to a process of reversing the ciphertext to the plaintext. For this purpose, the input terminal $105_i$ is supplied with $1/a_{m-i+1}$ (mod $p_{m-i+1}$), $-b_{m-i+1}/a_{m-i+1}$ (mod $p_{m-i+1}$), and $p_{m-i+1}$ instead of $a_i$, $b_i$, and $p_i$ while the input terminal $106_i$ is supplied with $K_{m-i}$ instead of $K_i$. Then, when the ciphertext is supplied to the input terminal 104, the output terminal 107 produces the plaintext.

Figure 4:
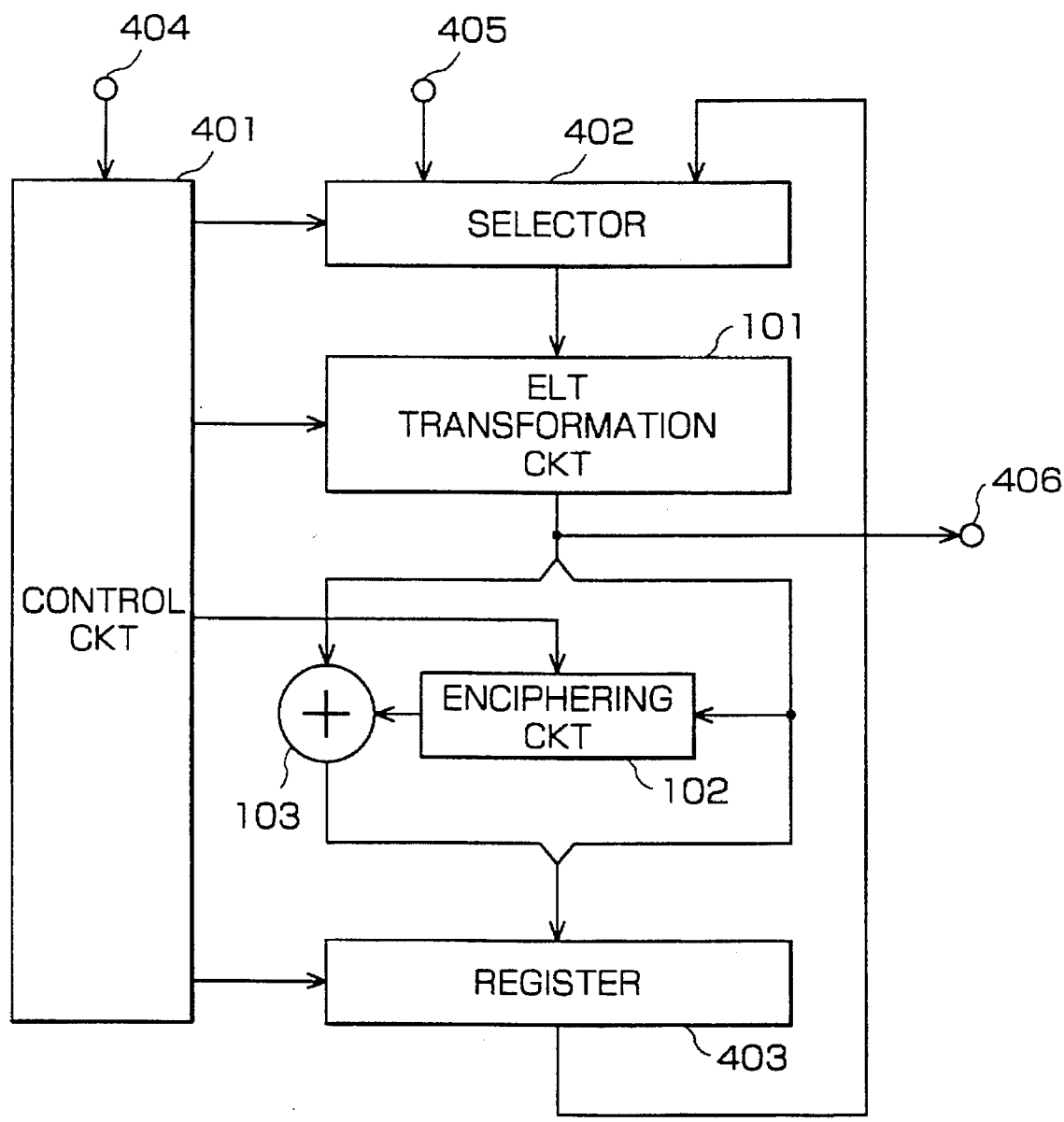
FIG. 4 shows a block diagram of a secret-key enciphering arrangement according to a second embodiment of this invention.

Now, a second embodiment of this invention will be described. FIG. 4 shows a block diagram of the second embodiment of this invention. In the figure, similar parts similar to those illustrated in FIG. 1 are designated by like reference numerals. The second embodiment illustrated in FIG. 4 comprises an ELT transformation circuit 101, an enciphering circuit 102, an exclusive-OR circuit 103, a control circuit 401, a selector 402, and a register 403 and has input terminals 404 and 405 and an output terminal 406.

The ELT transformation circuit 101 has a structure illustrated in FIG. 2 and is for carrying out ELT transformation on an n-bit input to produce a transformation result. The enciphering circuit 102 has a structure illustrated in FIG. 3 and is for enciphering an n/2-bit input to produce a ciphertext. The exclusive-OR circuit 103 carries out an exclusive-OR operation between two n/2-bit inputs bit by bit to produce a calculation result.

Next, description will be made as regards an operation of this embodiment. The input terminal 404 is preliminarily supplied with the parameters $a_i$, $b_i$, and $p_i$ (i=1, 2, ..., m) to be used in the ELT transformation circuit 101 and with the cryptographic key $K_i$ (i=1, 2, ..., m−1) to be used in the enciphering circuit 102. These values are supplied to the control circuit 401 and stored therein. A plaintext of n bits long is supplied. via the input terminal 405 to the selector 402.

The control circuit 401 at first supplies a control signal to the selector 402 so that the plaintext supplied to the input terminal 405 is outputted from the. selector 402. Then, the following operation is repeated m−1 times. At first, the control circuit 401 supplies the parameters $a_1$, $b_1$, and $p_1$ to the ELT transformation circuit 101 on one hand and supplies the cryptographic key $K_1$ to the enciphering circuit 102 on the other hand.

Supplied from the selector 402 with the plaintext to be subjected to encipherment, the ELT transformation circuit 101 carries out ELT transformation on the plaintext by the use of the parameters $a_1$, $b_1$, and $p_1$ supplied from the control circuit 401 to produce an n-bit transformation result. In the n-bit transformation result, low-order n/2 bits are supplied to the enciphering circuit 102 and the register 403 while high-order n/2 bits are supplied to one of n/2-bit input terminals of the exclusive-OR circuit 103.

With reference to the cryptographic key $K_1$ from the control circuit 401, the enciphering circuit 102 enciphers the input (corresponding to the input at the input terminal 303 in FIG. 3) of the low-order n/2 bits from the ELT transformation circuit 101. A resultant n/2-bit ciphertext is supplied to the other n/2-bit input terminal of the exclusive-OR circuit 103. The exclusive-OR circuit 103 carries out an exclusive-OR operation between the two n/2-bit inputs for every corresponding bits of the same order to produce an n/2-bit calculation result which is supplied to the register 403.

The control circuit 401 supplies a control signal to the register 403 to make the register hold the n/2 bits supplied from the exclusive-OR circuit 103 and the n/2 bits supplied from the ELT transformation circuit 101 as high-order n/2 bits and low-order n/2 bits in an n-bit memory. The n-bit value held in the register 403 is supplied to the selector 402. When a new n-bit value is held in the register 403, the control circuit 401 controls the selector 402 to make the selector select the output of the register 403.

Next, the control circuit 401 supplies a control signal to make the selector 402 select the output of the register 403, supplies the parameters $a_2$, $b_2$, and $p_2$ to the ELT transformation circuit 101, and supplies the cryptographic key $K_2$ to the enciphering circuit 102. The operation similar to that described above is carried out and a new value is held in the register 483. Subsequently, the similar operation is repeated m−1 times in total. Then the control circuit 401 supplies a control signal to make the selector 402 select the output of the register 403 and supplies the parameters $a_m$, $b_m$, and $p_m$ to the ELT transformation circuit 101. By the use of the parameters $a_m$, $b_m$, and $p_m$ the ELT transformation circuit 101 carried out ELT transformation upon the n bits from the selector 402 to produce a transformation result which is delivered to the output terminal 406 as a ciphertext.

As described above, even if the cryptographic key $p_i$ has a value close to $2^{n-1}$, it is possible according to this embodiment to uniformly distribute the ciphertext over a range between 0 and $2_{n-1}$, like the first embodiment. In addition, the number of each of the ELT transformation circuit 101, the enciphering circuit 102, and the exclusive- OR circuit 103 is reduced to one accordingly, the circuit structure can be simplified as compared with the first embodiment.

The second embodiment illustrated in FIG. 4 can be used to reverse the ciphertext into the plaintext. For this purpose, the data supplied to the input terminal 404 are changed. The control circuit 401 is supplied with $1/a_{m-i+1}$ (mod $p_{m-i+1}$), $-b_{m-i+1}/a_{m-i+1}$ (mod $p_{m-i+1}$) and $p_{m-i+1}$ instead of $a_i$, $b_i$, and $p_i$ and with $K_{m-i+1}$ instead of $K_i$. Then, when the input terminal 405 is supplied with the ciphertext, the plaintext is produced via the output terminal 406.

It will be understood that this invention is not restricted to the foregoing embodiments. For example, although all of $a_i$, $b_i$, and $p_i$ (i=1, 2, ..., m) are used as parameters, $a_i$ and $b_i$ may be fixed. It is not essential that all of ($A_{i,1}$, $B_{i,1}$, $P_{i,1}$, $A_{i,2}$, $B_{i,2}$, $P_{i,2}$) (i=1, 2, ..., m−1) as $K_i$ are used as the cryptographic key. ($A_{i,1}$, $B_{i,1}$, $A_{i,2}$, $B_{i,2}$) (i=1, 2, ..., m−1) may be fixed to particular values.

By selecting exponential power of 2 as values of $A_{i,j}$ (i=1, ..., m−1, j=1, 2), multiplication in the ELT transformation circuit 301 becomes unnecessary (replaced by a shift operation). In addition, by selecting a value smaller than $A_{i,j}$, for example, $2^{n/2}-1$ as values of $B_{i,j}$ (i=1, ..., m−1, j=1, 2), addition in the ELT transformation circuit 301 becomes unnecessary. The enciphering circuits $102_1$ to $102_{m-1}$ and 102 may be of any type as far as the input and the output have a length of n/2 bits.

In the method and the arrangement of this invention, the low-order n/2 bits of the output of the ELT transformation circuit is enciphered. The exclusive-OR operation is carried out between the enciphered n/2 bits and the high-order n/2 bits of-the n-bit transformation result produced by the ELT transformation circuit for every corresponding bits. Another ELT transformation is repeatedly carried out upon the n-bit input composed of the exclusive-OR operation result and the low-order n/2 bits of the n-bit transformation result produced by the ELT transformation circuit as the high-order n/2 bits and the low-order n/2 bits, respectively. Thus, the transformation result of the ELT transformation can be uniformly scrambled within a range between 0 and $2^n-1$.

When the ELT transformation is carried out by the use of the parameters $1/a_{m-i+1}$ (mod $p_{m-i+1}$), $-b_{m-i+1}/a_{m-i+1}$ (mod $p_{m-i+1}$), and $p_{m-i+1}$ instead of the integers $a_i$, $b_i$, and $p_i$ (i=1, 2, ..., m), the ciphertext can be reversed into the original plaintext.

In the arrangement of this invention, the same ELT transformation circuit, the same enciphering circuit, and the same exclusive-OR circuit can be repeatedly used by provision of the control circuit, the selector, and the register.

As described above, according to the method and the arrangement of this invention, the low-order n/2 bits of the output of the ELT transformation circuit is enciphered, The exclusive-OR operation is carried out between the enciphered n/2 bits and the high-order n/2 bits of the n-bit transformation result produced by the ELT transformation circuit for every corresponding bits. Another ELT transformation is repeatedly carried out upon the n-bit input composed of the exclusive-OR operation result and the low-order n/2 bits of the n-bit transformation result produced by the ELT transformation circuit as the high-order n/2 bits and the low-order n/2 bits, respectively. In this manner, the transformation result of the ELT transformation is uniformly scrambled over a range between 0 and $2^n-1$. Accordingly, even if the transformation parameter $P_i$ has a value close to $2^{n-1}$, the ciphertext is uniformly distributed over the range between 0 and $2^n-1$. As a result, it is extremely difficult to presume the value of the most significant bit of the plaintext from the value of the most significant bit of the ciphertext. Thus, secrecy can be improved as compared with the prior art.

In the arrangement of this invention, the same ELT transformation circuit the same enciphering circuit, and the same exclusive-OR circuit cab be repeatedly used by provision of the control circuit, the selector, and the register. Accordingly, the circuit structure can be simplified as compared with the structure including a plurality of the ELT transformation circuits, the enciphering circuits, and the exclusive-OR circuits.

What is claimed is:

1. A secret-key enciphering method in which a first transformation is a process of producing, when an input x has a value smaller than $P_i$ an output represented by $a_ix+b_i$ (mod $p_i$) where $a_i$, $b_i$, and $P_i$ (i=1, 2, ..., m) are predetermined integers and of producing an output equivalent to x when the input x has a value not smaller than $p_i$, a second transformation being a process of producing an output obtained by inverting a most significant bit of an input, said method comprising the steps of:

subjecting an n-bit input to ELT transformation composed of said first, said second, and said first transformations in this order to produce an n-bit transformation result;

enciphering, in accordance with a predetermined cryptosystem, low-order n/2 bits of said n-bit transformation result of the ELT transformation to obtain an n/2-bit ciphertext;

carrying out an exclusive-OR operation between said n/2-bit ciphertext and high-order n/2 bits of said n-bit transformation result of the ELT transformation for every corresponding bits to produce an exclusive-OR operation result;

carrying out the above-mentioned ELT transformation upon an n-bit input composed of said exclusive-OR operation result and the low-order n/2 bits of said n-bit transformation result of the ELT transformation as high-order n/2 bits and low-order n/2 bits, respectively;

repeating the above-mentioned steps m−1 times (m being a predetermined integer not smaller than 2) in total; and carrying out the above mentioned ELT transformation of an m-th (i=m) time upon an n-bit input composed of an (m−1)-th exclusive-OR operation result and low-order n/2 bits of an n-bit transformation result of the above-mentioned ELT transformation of an (m−1)-th (i=m−1) time to produce a transformation result as a ciphertext.

2. A secret-key enciphering method as claimed in claim 1, wherein said ELT transformation is carried out by the use of parameters $1/a_{m-i+1}$ (mod $p_{m-i+1}$), $-b_{m-i+1}/a_{m-i+1}$ (mod $p_{m-i+1}$), and $p_{m-i+1}$ instead of the above-mentioned integers $a_i$, $b_i$, and $p_i$ (i=1, 2, ..., m), respectively.

3. A secret-key enciphering method as claimed in claim 1, wherein said predetermined cryptosystem comprises the steps of:

subjecting an n/2-bit input to the above-mentioned ELT transformation of a first time by the use of parameters $A_{i,1}$, $B_{i,1}$, and $P_{i,1}$ among predetermined n/2-bit integers $A_{i,j}$, $B_{i,j}$ and $P_{i,j}$ (i=1, 2, ..., m−1, j=1, 2) to produce a transformation result;

carrying out an exclusive-OR operation between low-order n/4 bits and high-order n/4 bits of said transformation result in bit-to-bit correspondence to produce an exclusive-OR operation result; and carrying out the above-mentioned ELT transformation of a second time upon an input composed of said exclusive-OR operation result and the low-order n/4 bits of said transformation result as high-order n/4 bits and low-order n/4 bits, respectively, to produce an n/2-bit transformation result as a ciphertext.

4. A secret-key enciphering arrangement in which a first transformation is a process of producing, when an input x has a value smaller than $p_i$, an output represented by $a_i x+b_i$ (mod $p_i$) where $a_i$, $b_i$, and $p_i$ (i=1, 2, ..., m) are predetermined integers and of producing an output equivalent to x when the input x has a value not smaller than $p_i$, a second transformation being a process of producing an output obtained by inverting a most significant bit of an input, said arrangement comprising:

ELT transformation circuits, m in total, each of which is responsive to an i-th n-bit input and carries out ELT transformation composed of said first, said second, and said first transformations in this order;

enciphering circuits, (m−1) in total, each of which is for enciphering, in accordance with a predetermined cryptosystem, low-order n/2 bits of an n-bit transformation result produced by the k-th (k=1, 2, ..., m−1) one of said ELT transformation circuits to produce a k-th n/2-bit ciphertext; and exclusive-OR circuits, (m−1) in total, each of which is for carrying out an exclusive-OR operation between high-order n/2 bits of said n-bit transformation result produced by said k-th ELT transformation circuit and said ciphertext produced by a k-th one of said enciphering circuits for every corresponding bits to produce an operation result which is delivered to a (k+1)-th one of said ELT transformation circuits;

said (k+1)-th ELT transformation circuit carrying out ELT transformation upon an n-bit input composed of said operation result produced by a k-th one of said exclusive-OR circuits and the low-order n/2 bits of said n-bit transformation result produced by said k-th ELT transformation circuit as high-order n/2 bits and low-order n/2 bits, respectively, until an m-th one of said ELT transformation circuits produces a ciphertext.

5. A secret-key enciphering arrangement as claimed in claim 4, wherein said enciphering circuit carries out the above-mentioned ELT transformation of a first time upon an n/2-bit input by the use of parameters $A_{i,1}$, $B_{i,j}$, and $P_{i,1}$ among predetermined n/2-bit integers $A_{i,j}$, $B_{i,j}$, and $P_{i,j}$ (i=1, 2, ..., m−1, j=1, 2) as a cryptographic key $K_i$ to produce a transformation result, an exclusive-OR operation between low-order n/4 bits and high-order n/4 bits of said transformation result in bit-to-bit correspondence to produce an exclusive-OR operation result, and the above-mentioned ELT transformation of a second time upon an input composed of said exclusive-OR operation result and the low-order n/4 bits of said transformation result as high-order n/4 bits and low-order n/4 bits, respectively, to produce an n/2-bit transformation result as a ciphertext.

6. A secret-key enciphering arrangement in which a first transformation is a process of producing, when an input x has a value smaller than $p_i$ an output represented by $a_i x+b_i$ (mod $p_i$) where $a_i$, $b_i$, and $p_i$ (i=1, 2, ..., m) are predetermined integers and of producing an output equivalent to x when the input x has a value not smaller than $p_i$, a second transformation being a process of producing an output obtained by inverting a most significant bit of an input, said arrangement comprising:

an ELT transformation circuit responsive to an i-th n-bit input for carrying out ELT transformation composed of said first, said second, and said first transformations in this order;

an enciphering circuit for enciphering, in accordance with a predetermined cryptosystem and by the use of a cryptographic key $K_i$ (i=1, ..., m−1), low-order n/2 bits of an n-bit transformation result produced by said ELT transformation circuit to produce an n/2-bit ciphertext;

an exclusive-OR circuit for carrying out an exclusive-OR operation between high-order n/2 bits of said n-bit transformation result produced by said ELT transformation circuit and said ciphertext produced by said enciphering circuit for every corresponding bits to produce an operation result which is delivered to said ELT transformation circuit;

a register for holding an n-bit input composed of said operation result produced by said exclusive-OR circuit and the low-order n/2 bits of said n-bit transformation result produced by said ELT transformation circuit as high-order n/2 bits and low-order n/2 bits, respectively;

a selector for selecting one of an n-bit input from an external source and an n-bit output of said register to supply a selected one to said ELT transformation circuit as said input x; and a control circuit for successively supplying said ELT transformation circuit and said enciphering circuit with said integers $a_i$, $b_i$, and $p_i$ and said cryptographic key $K_i$ and for controlling said selector to make said selector select the output of said register when a new value is held in said register;

an m-th transformation result of said MET transformation circuit being delivered to an output terminal.

7. A secret-key enciphering arrangement as claimed in claim 6, wherein said enciphering circuit carries out the above-mentioned ELT transformation of a first time upon an n/2-bit input by the use of parameters $A_{i,1}$, $B_{i,1}$, and $P_{i,1}$ among predetermined n/2-bit integers $A_{i,j}$, $B_{i,j}$, and $P_{i,j}$ (i=1, 2, ..., m−1, j=1, 2) as a cryptographic key $K_1$ to produce a transformation result, an exclusive-OR operation between low-order n/4 bits and high-order n/4 bits of said transformation result in bit-to-bit corresponaence to produce an exclusive-OR operation result, and the above-mentioned ELT transformation of a second time upon an input composed of said exclusive-OR operation result and the low-order n/4 bits of said transformation result as high-order n/4 bits and low-order n/4 bits, respectively, to produce an n/2-bit transformation result as a ciphertext.

* * * * *